US008199643B2

(12) United States Patent
Hirsch et al.

(10) Patent No.: US 8,199,643 B2
(45) Date of Patent: Jun. 12, 2012

(54) OPTIMIZATION STRATEGIES FOR RESOURCE MANAGEMENT AND COURSE OF ACTION ANALYSIS

(75) Inventors: Michael J. Hirsch, St. Petersburg, FL (US); David M. Sudit, Getzville, NY (US); Rakesh Nagi, East Amherst, NY (US)

(73) Assignee: Raytheon Company, Waltham, MA (US)

( * ) Notice: Subject to any disclaimer, the term of this patent is extended or adjusted under 35 U.S.C. 154(b) by 344 days.

(21) Appl. No.: 12/687,516

(22) Filed: Jan. 14, 2010

(65) Prior Publication Data
US 2010/0182969 A1 Jul. 22, 2010

Related U.S. Application Data

(60) Provisional application No. 61/145,841, filed on Jan. 20, 2009.

(51) Int. Cl.
*H04L 12/26* (2006.01)
*H04W 4/00* (2009.01)
*G06F 17/30* (2006.01)
*G06F 15/16* (2006.01)

(52) U.S. Cl. ........ 370/230; 370/252; 370/338; 370/401; 707/780; 707/804; 709/203; 709/217

(58) Field of Classification Search .......... 370/229–231, 370/252, 329, 332, 338, 400–401; 455/17, 455/67.16, 509, 518; 707/780, 802–804; 709/203, 217–219, 224, 249
See application file for complete search history.

(56) References Cited

U.S. PATENT DOCUMENTS

| | | | | |
|---|---|---|---|---|
| 6,735,630 B1 * | 5/2004 | Gelvin et al. | ................. | 709/224 |
| 7,747,364 B2 * | 6/2010 | Roy et al. | ........................ | 701/28 |
| 7,908,040 B2 * | 3/2011 | Howard et al. | .................... | 701/1 |
| 8,010,658 B2 * | 8/2011 | Khosla et al. | ................. | 709/224 |
| 2010/0318322 A1 * | 12/2010 | Brauer et al. | ................. | 702/152 |

OTHER PUBLICATIONS

*A Stochastic Optimization Framework for Resource Management and Course of Action Analysis*; Michael J. Hirsh, et al.; ISBN 978-3-8007-3092-6; Information Fusion, 2008 11th International Conference; pp. 638-644, Jun. 30-Jul. 3, 2008.
*A Stochastic Optimization Framework for Resource Management and Course of Action Analysis*; Michael J. Hirsch, et al.; 11th International Conference on Information Fusion; 33 pages, Jun. 30-Jul. 3, 2008.

* cited by examiner

*Primary Examiner* — Tri H Phan
(74) *Attorney, Agent, or Firm* — Cantor Colburn LLP

(57) ABSTRACT

A method for allocating resources includes receiving one or more parameters associated with an object of interest. At least one of the parameters corresponds to a probability that the object of interest is participating in a predetermined situation of interest. The method also includes calculating a plurality of values, based at least in part on the parameters, and selecting, based at least in part on the calculated values, one or more operations to be performed involving the object of interest. In addition the method includes generating an instruction based at least in part on the operation to be performed transmitting the instruction to an operational resource.

23 Claims, 9 Drawing Sheets

HIGH-LEVEL PSEUDO-CODE FOR GRASP

```
procedure GRASP(Problem Instance)
1      Input Instance();
2      while stopping criteria not met do
3              ConstructGreedyRandomizedSolution(Solution);
4              LocalSearch(Solution);
5              if solution is better than BestSolution then
6                      UpdateBestSolution(Solution,BestSolution);
7              end if
8      end while
9      return(Best Solution);
end GRASP;
```

*FIG. 3A*

HIGH-LEVEL PSEUDO-CODE FOR CONSTRUCTION PROCEDURE

```
procedure ConstructGreedyRandomizedSolution(Problem Instance)
1      Solution ← 0;
2      while Solution construction not done do
3              MakeRCL(RCL);
4              S ← SelectRandomElement(RCL);
5              Solution ← Solution ∪ {S};
6              AdaptGreedyFunction(S);
7      end while
8      return(Solution);
end ConstructGreedyRandomizedSolution;
```

*FIG. 3B*

HIGH-LEVEL PSEUDO-CODE LOCAL SEARCH PROCEDURE

```
procedure LocalSearchSolution, Neighborhood))
1      Solution* ← Solution;
2      while Solution* not locally optimal do
3              Solution ← SelectRandomElement(Neighborhood(Solution*));
4              if Solution better than Solution* then;
5                      Solution* ← Solution;
6              end if;
7      end while
8      return(Solution*);
end LocalSearch;
```

*FIG. 3C*

SHIP DATA

| ID | LONGITUDE | LATITUDE | SPEED | TIME | SITUATIONS | LIKELIHOOD |
|---|---|---|---|---|---|---|
| SHIP 1 | 108.86 | 2.87 | 12.55 | 138.33 | $S_2$ | 0.83 |
| SHIP 2 | 17.19 | 34.38 | 18.64 | 136.80 | $S_1$ | 0.98 |
| SHIP 3 | 320.86 | 34.38 | 7.97 | 90.84 | $S_6$ | 0.87 |
| SHIP 4 | 137.51 | 28.65 | 11.88 | 104.70 | $S_4$ | 0.90 |
| SHIP 5 | 280.75 | 8.02 | 7.97 | 139.30 | $S_1$ | 0.99 |
| SHIP 6 | 297.94 | 11.46 | 11.88 | 98.40 | $S_3$ | 0.98 |
|  |  |  |  |  | $S_4$ | 0.86 |
|  |  |  |  |  | $S_6$ | 0.87 |
| SHIP 7 | 263.56 | 11.46 | 7.97 | 80.30 | $S_3$ | 0.80 |
| SHIP 8 | 320.86 | -22.92 | 11.88 | 111.30 | $S_1$ | 0.96 |
|  |  |  |  |  | $S_3$ | 0.76 |
|  |  |  |  |  | $S_4$ | 0.92 |
| SHIP 9 | 297.94 | -45.84 | 11.88 | 125.70 | $S_1$ | 0.94 |
|  |  |  |  |  | $S_3$ | 0.87 |
| SHIP 10 | 60.16 | 24.06 | 14.37 | 134.40 | $S_4$ | 0.92 |
|  |  |  |  |  | $S_5$ | 0.91 |
| SHIP 11 | 17.19 | -34.38 | 8.61 | 124.70 | $S_6$ | 1.00 |
| SHIP 12 | 349.50 | 35.52 | 13.78 | 127.90 | $S_3$ | 0.99 |
|  |  |  |  |  | $S_5$ | 1.00 |

*FIG. 5A*

AVAILABLE OPERATIONS

| INFORMATION RESOURCE | SEARCH | MONITOR | INTERDICT |
|---|---|---|---|
| UAV | X | X |  |
| CUTTER |  | X | X |

*FIG. 5C*

OPERATIONAL
RESOURCE POSITIONS

| ID | LONGITUDE | LATITUDE |
|---|---|---|
| UAV 1 | 16.00 | 36.00 |
| UAV 2 | 17.00 | 19.81 |
| UAV 3 | 241.79 | 33.81 |
| UAV 4 | 279.03 | 29.45 |
| CUTTER 1 | 97.40 | -2.87 |
| CUTTER 2 | 57.30 | 11.46 |
| CUTTER 3 | 279.04 | 29.45 |
| CUTTER 4 | 269.43 | -29.45 |
| CUTTER 5 | 284.77 | 29.57 |
| CUTTER 6 | 300.23 | 40.74 |

*FIG. 5D*

OPERATIONAL
RESOURCE SCHEDULES

| INFORMATION RESOURCE | ACTION | ON |
|---|---|---|
| UAV 1 | MONITOR BEHAVIOR | SHIP 8 |
| UAV 2 | MONITOR BEHAVIOR | SHIP 11 |
| UAV 3 | DETERMINE LOCATION | SHIP 7 |
|  | DETERMINE LOCATION | SHIP 4 |
| UAV 4 | DETERMINE LOCATION | SHIP 3 |
|  | DETERMINE LOCATION | SHIP 6 |
| CUTTER 1 | INTERDICT | SHIP 1 |
| CUTTER 2 | INTERDICT | SHIP 10 |
| CUTTER 3 |  |  |
| CUTTER 4 | INTERDICT | SHIP 9 |
| CUTTER 5 | INTERDICT | SHIP 5 |
| CUTTER 6 | INTERDICT | SHIP 12 |
|  | INTERDICT | SHIP 2 |

*FIG. 6A*

OPTIMIZATION STRATEGIES FOR RESOURCE MANAGEMENT AND COURSE OF ACTION ANALYSIS

CROSS REFERENCE TO RELATED APPLICATION

This application claims the benefit of U.S. Provisional Application No. 61/145,841 filed Jan. 20, 2009, which is incorporated by reference in its entirety herein.

TECHNICAL FIELD OF THE INVENTION

This invention relates generally to the management of information-collecting resources and more particularly to a method and system for optimizing the use of information-collecting resources to monitor and interact with objects of interest.

BACKGROUND OF THE INVENTION

Information fusion is a process for associating, correlating, and combining data and information from one or more sources to achieve refined estimates of parameters, characteristics, events, and behaviors for observed entities in an observed field of view. Accordingly, information fusion techniques combine data from multiple sources to achieve improved accuracies and more specific inferences. From an "Observe, Orient, Decide, and Act" ("OODA") loop perspective, information fusion capabilities increase situational awareness. That is, these capabilities provide improved results in the "Observe" and "Orient" stages of the OODA loop. Once accurate situational awareness is achieved, a response can be formulated and executed, as part of the "Decide" and "Act" stages of the OODA loop. These "Decide" and "Act" stages may, in turn, serve to further increase situational awareness. The "Decide" and "Act" phases of the OODA loop may be viewed as Course of Action and Resource Management problems having a goal of placing the right resource in the right place at the right time to perform an appropriate information-gathering task on a desired object of interest. Thus, information fusion technologies can be used as an input to OODA-loop decision-making to improve placement and usage of information resources.

SUMMARY OF THE INVENTION

The present invention provides a method and system for allocating a limited set of resources to respond to objects of interest operating in an area of interest that substantially reduces or eliminates at least some of the disadvantages and problems associated with previous methods and systems for allocating such resources.

In accordance with one embodiment of the present invention, a method for allocating resources includes receiving one or more parameters associated with an object of interest. At least one of the parameters corresponds to a probability that the object of interest is participating in a predetermined situation of interest. The method also includes calculating a plurality of values, based at least in part on the parameters, and selecting, based at least in part on the calculated values, one or more operations to be performed involving the object of interest. In addition, the method includes generating an instruction based at least in part on the operation to be performed transmitting the instruction to an operational resource.

In accordance with another embodiment of the present invention, a system for allocating resources includes a sensor capable of generating one or more parameters associated with an object of interest and transmitting the parameters to a resource allocator. The system also includes a resource allocator capable of receiving the parameters and generating, based on the parameters, an instruction indicating an operation to be performed on an object of interest. The resource allocator is also capable of transmitting the instruction to an operational resource capable of performing the operation.

Important technical advantages of certain aspects of the present invention include optimizing the use of a limited set of information resources to respond to situations of interest evolving in real-time. Particular embodiments effectively couple information fusion capabilities with course of action analysis and/or resource allocation efforts and directly relate Level-2 data fusion with Level-4 data fusion in a mathematically rigorous way. By utilizing a mathematically rigorous function to process sets of parameters generated by information sources, the system puts the operational resources in the right place and time to perform appropriate information gathering tasks on selected objects of interest. Additional technical advantages of certain embodiments of the present invention include a reduction in unproductive or sub-optimal use of operational resources. Other technical advantages of the present invention will be readily apparent to one skilled in the art from the following figures, description, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantage, reference is now made to the following descriptions, taken in conjunction with the accompanying drawings, in which:

FIGS. 3A-3C provide examples of pseudo-code that may be implemented in particular embodiments of the resource allocation system;

FIGS. 5A-5E illustrate example inputs that may utilized by certain embodiments of the resource allocation system; and FIGS. 6A-6C illustrate example outputs that may be produced by certain embodiments of the resource allocation system.

DETAILED DESCRIPTION OF THE INVENTION

Figure 1:
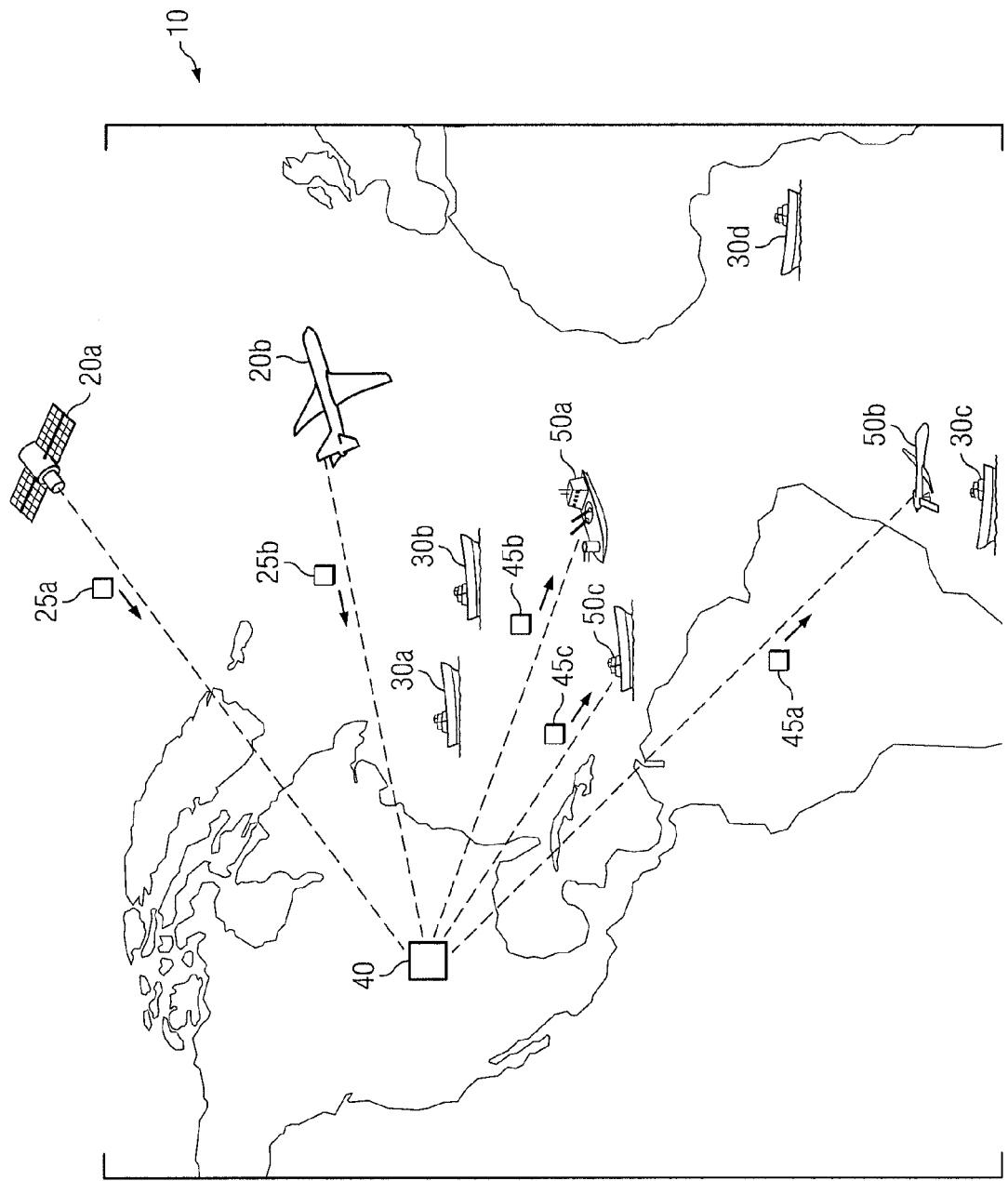
FIG. 1 is a block diagram illustrating a resource allocation system according to particular embodiments of the present invention.

FIG. 1 illustrates a particular embodiment of a system 10 for allocating information resources to perform operations on objects of interest 30 based on the likelihood that these objects of interest 30 are participating in one or more situations of interest. System 10 includes one or more sensors 20, one or more objects of interest 30, a resource allocator 40, and one or more operational resources 50. To facilitate the allocation of operational resources 50, resource allocator 40 may process parameters 25 received from sensors 20a-b and generate an instruction 45 directing a particular operational resource 50 to perform an operation on a particular object of interest 30. As described further below, in particular embodiments, instructions 45 may be generated by system 10 based on a mathematical optimization of certain factors and considerations relevant to the allocation of operational resources 50.

Sensors 20a-b (each of which may be referred to generically as a "sensor 20") observe objects of interest 30, generate one or more parameters 25 associated with objects of interest 30, and transmit parameters 25 to resource allocator 40. Sensors 20 may represent any appropriate types of device suitable to observe objects of interest 30 and generate parameters 25, including but not limited to digital cameras, film cameras, satellite imaging systems, radar imaging systems, infrared imaging systems, sonar imaging systems, x-ray imaging systems, video cameras, and/or imaging systems having object-recognition and identification technology. In general, however, sensors 20 may represent any appropriate combination of hardware, software, and/or encoded logic suitable to provide the described functionality.

Sensors 20 may be located in any location suitable for observing objects of interest 30. For example, sensors 20 may be located on unmanned or manned aerial vehicles, moving or stationary vehicles, surface or subsurface ships, fixed structures, or extra-terrestrial satellites. Sensor 20 may couple to resource allocator 40 through a dedicated connection (wired or wireless), or may connect to resource allocator 40 only as necessary to transmit parameters 25. Although FIG. 1 illustrates for purposes of example a particular number and type of sensors 20, alternative embodiments of system 10 may include any appropriate number and suitable types of sensors 20.

Parameters 25 are generated by sensors 20 and received by resource allocator 40. Parameters 25 may represent any appropriate type of data describing a person, object, location, or other item of interest. Parameters 25 may represent or include an object type for a particular object of interest 30 observed by the relevant sensor 20, a position of the observed object of interest 30, a velocity of the observed object of interest 30, a time at which the relevant sensor 20 determined the position or velocity of the observed object of interest 30, information identifying a situation of interest that the observed object of interest 30 may be participating in and/or any other data describing objects of interest 30 that may be generated by sensors 20. Furthermore, depending on the configuration and capabilities of sensors 20 and system 10 in general, parameters 25 may represent data transmitted by sensors 20 as a text file, as a relational database file, in a datastream, as a series of one or more packets, or as information structured in any other suitable manner.

Objects of interest 30a-d (each of which may be referred to generically as an "object of interest 30") are positioned and/or operate in an area of interest observed by sensors 20. Objects of interest 30 may be ground-based vehicles, surface or subsurface ships, manned or unmanned aerial vehicles, machines, humans, buildings, structures, topographical features, natural phenomenon, or any other object, location, or substance. Although FIG. 1 illustrates for purposes of example a particular number and type of objects of interest 30, alternative embodiments of system 10 may include any appropriate number and type of objects of interest 30.

Resource allocator 40 receives parameters 25 from sensors 20, generates instructions 45, and transmits instructions 45 to operational resources 50. Resource allocator 40 may be any appropriate type of computing device suitable to process parameters 25 received from sensors 20, generate instructions 45 for operational resource 50, and transmit instructions 45 to operational resource 50. For example, resource allocator 40 may include or represent computer workstations, laptops, blade servers, server farms, standalone servers, or any other processing element suitable to provide the described functionality. Although shown in FIG. 1 as a single component, in particular embodiments, resource allocator 40 may represent functionality provided by several separate physical components. More generally, resource allocator 40 may represent any appropriate combination of software and/or hardware suitable to provide the described functionality. The contents and operation of a particular embodiment of resource allocator 40 are described in greater detail below with respect to FIG. 2.

Instructions 45 (each of which may be referred to generically as an "instruction 45") are generated by resource allocator 40 and received by operational resources 50. In particular embodiments, instructions 45 may each represent electronic signals transmitted to an operational resource 50 that directs that operational resource 50 to perform or not perform an action. Furthermore, depending on the configuration and capabilities of resource allocator 40 and system 10 generally, instruction 45 may represent data transmitted by resource allocator 40 as an electromagnetic wave signal, a text file, a relational database file, a datastream, a series of one or more packets, or as information structured in any other suitable manner.

Operational resources 50a-c (each of which may be referred to generically as an "operational resource 50") receive instructions 45 from resource allocator 40 and perform operations associated with objects of interest 30. Operational resources 50 may represent ground-based vehicles, surface or subsurface ships, manned or unmanned aerial vehicles, moving or stationary machines, robots, humans, or any other objects or elements capable of receiving instructions 45 from resource allocator 40 and carrying out actions associated with objects of interest 30 based on such instructions 45. Additionally, in particular embodiments, any of operational resources 50 may also serve as a sensor 20. Although FIG. 1 illustrates for purposes of example a particular number and type of operational resources 50, alternative embodiments of system 10 may include any appropriate number and suitable types of operational resource 50.

In operation, resource allocator 40 receives parameters 25 from sensors 20 regarding objects of interest 30 and manages the operations of operational resources 50 based on such parameters. In particular embodiments, resource allocator 40 may utilize parameters 25 as inputs to a resource allocation equation that resource allocator 40 optimizes to determine appropriate operations to be performed and/or select appropriate operational resources 50 with which to perform one or more operations. As one example, in particular embodiments, resource allocator 40 may input parameters 25 describing objects of interest 30 and data describing the current status of operational resources 50 and/or the state of system 10 generally into a weighted function quantifying the utility of the operations performed by operational resources 50 and determine the combination of operations and/or operational resources 50 that maximize the value of this utility. As another example, in particular embodiments, resource allocator 40 may input parameters 25 into an objective function that quantifies the sum of expected start times for a prioritized set of actions selected based on priorities associated with a set of potential events occurring in or associated with system 10. An example of the operation of such an embodiment of resource allocator 40 is described in greater detail below with respect to FIG. 2. In general, by determining a mathematically-optimized set of operations to be performed, and optimally assigning these operations to available operational resources 50, system 10 may be able to allocate a limited set of resources to respond to a range potential situations as these situations evolve in real-time.

Thus, operation begins in the illustrated embodiment with a user defining an ordered list of situations of interest. In particular embodiments, situations of interest are ordered by a priority level indicating the importance of the situation of interest. For example, a situation of interest defining the smuggling of a nuclear weapon on board a merchant ship may be given a higher priority than a situation defining the smuggling of stolen archeological artifacts. As another example, a situation of interest defining a machine that has malfunctioned may be given a higher priority than a situation of interest defining a machine that is low on supplies. In particular embodiments, objects of interest 30 may all participate in the same situations of interest, in different situations of interest, or in multiple situations of interest.

Additionally, in particular embodiments, the user may also define operations that operational resource 50 may perform on objects of interest 30. These operations may also be ordered by a priority level or otherwise prioritized to indicate the importance of the operation. The operations may include any actions appropriate for addressing, investigating, or otherwise responding to objects of interest 30 and/or events of interest in which these objects of interest 30 are involved, and depending on the configuration of system 10 may be specific to the activities and events occurring in system 10. For example, in an embodiment of system 10 configured to manage military intelligence and operational resources, the set of operations might include monitoring the behavior of particular objects of interest 30, destroying objects of interest 30, intercepting objects of interest 30, stopping objects of interest 30, or generating additional information (e.g., more parameters 25) associated with objects of interest 30 and transmitting this additional information to resource allocator 40. Similarly, in an embodiment of system 10 configured to manage resources in a warehouse or industrial setting, the set of operations might include monitoring the behavior of particular objects of interest 30 (such as robot workers), stopping objects of interest 30, repairing objects of interest 30, moving to objects of interest, performing assigned tasks to or with objects of interest 30, and/or generating additional information (e.g., more parameters 25) associated with objects of interest 30 and transmitting this additional information to resource allocator 40.

Operation of system 10 proceeds, as shown in FIG. 1, with sensors 20 observing objects of interest 30 located in an area of interest monitored by those sensors 20. Sensors 20 may observe objects of interest 30 by using any appropriate technology capable of observing information associated with an object. For example, sensors 20 may observe objects of interest 30 by observing information in the radio frequency spectrum (e.g., sonar), the visual spectrum (e.g., film or video cameras), the infrared spectrum (e.g., infrared cameras), or the x-ray spectrum (e.g., x-ray cameras). Additionally, sensors 20 may observe objects of interest 30 with an unassisted or assisted human eye. In general, however, sensors 20 may observe information associated with objects of interest 30 in any appropriate manner suitable to perform the described functionality.

Sensors 20 then generate parameters 25 based on the observation of objects of interest 30 and transmit parameters 25 to resource allocator 40. Parameters 25 may include any appropriate data or information describing observed objects of interest 30 and/or events involving the observed objects of interest 30. Examples of parameters 25 that may be utilized in particular embodiments of system 10 include an object type of an observed object of interest 30, a position of an observed object of interest 30, a velocity of an observed object of interest 30, a time at which a particular sensor 20 observed a location or velocity of the relevant object of interest 30, and information indicating a situation of interest that an observed object of interest 30 may be participating in. In general, however, sensor 20 may generate any appropriate number and type of parameters suitable for use in system 10. Sensors 20 may then transmit the generated parameters 25 to resource allocator 40 by any appropriate transmission method, including, but not limited to, wired or wireless electronic signals, wired or wireless digital packet-based protocols, or by any other appropriate method suitable to perform the described functionality.

Resource allocator 40 receives parameters 25 from sensors 20. Resource allocator 40 may also receive parameters 25 from other sources (e.g., parameters 25 entered by a user) or itself generate parameters 25 relating to objects of interest 30, operational resources 50, or other elements of objects of interest 30. For example, resource allocator 40 may receive parameters 25 from operational resources 50 describing the current state of the relevant operational resources 50, such as a fuel status, an assignment status, a location, and/or other characteristics or properties of the relevant operational resource 50.

Based on parameters 25 received from sensors 20 and other parameters 25 received or generated by resource allocator 40, resource allocator 40 determines one or more operations to be performed by operational resources 50 operating in system 10. In particular embodiments, resource allocator 40 also selects, based on received or generated parameters 25, appropriate operational resources 50 to perform the determined operations. In general, resource allocator 40 may utilize any received or generated parameters 25 to determine the appropriate operations to perform and/or select appropriate operational resources 50 to perform operations. Depending on the configuration of system 10, resource allocator 40 may consider parameters 25 relating to a particular situation occurring or possibly occurring in system 10, such as the likelihood that the situation of interest exists, the likelihood that a particular object of interest 30 is participating in the situation of interest, a priority associated with the situation of interest; relating to operations to be performed in system 10, such as a priority associated with the operation, a time associated with completing the operation, or an informational value of the operation; relating to a particular operational resource 50, such as obstacles to be avoided by the operational resource 50, the location of a re-supply area for the operational resource 50, a maximum time the operational resource 50 can be away from a re-supply area, or the expected time needed for the operational resource 50 to respond; relating to particular objects of interest 30, such as the time of the most recent positional update on an object of interest 30, the most recent velocity update of an object of interest 30, the estimated position of an object of interest 30 at a certain time; and/or relating to policies or constraints of system 10, such as a maximum permitted time between the current time and the most recent positional update of an object of interest 30, a minimum permitted time between the current time and the most recent positional update of an object of interest 30, the time at which resource allocator 40 generates instruction 45, and the planning horizon for the operation to be performed. More generally, resource allocator 40 can use parameters 25 associated with any aspect of the state, configuration, or operation or system or any of its components to determine operations to be performed and/or select operational resources 50 to perform operations.

Based on the relevant parameters 25, resource allocator 40 then generates one or more values associated with each of a particular set of operations to be performed. For example, resource allocator 40 may use parameters 25 as an input to an equation that quantifies a cost and/or benefit of performing each set of operations and may mathematically optimize the equation to determine an optimal set of operations to perform. Additionally, resource allocator 40 may also select an optimized set of operation resources 50 to perform the selected operations based on parameters 25 and/or additional information available to resource allocator 40. An example of this process is described in greater detail below with respect to FIG. 2.

Resource allocator 40 may then generate instructions 45 to indicate the operations to be performed and transmit these instructions 45 to operational resources 50. Instructions 45 instruct operational resources 50 that receive instructions 45 to perform one or more operations on particular objects of interest 30. Instructions 45 may represent commands, messages, control signals, and other any other form of communication that indicates to a receiving operational resource 50 a particular operation to perform. Resource allocator 40 may transmit instructions 45 to operational resources 50 by any appropriate transmission method, including, but not limited to, wired or wireless electronic signals, wired or wireless digital packet-based protocols, or by any other appropriate method suitable to perform the described functionality.

Operational resources 50 receive instructions 45 from resource allocator 40 and perform operations identified by instructions 45 involving objects of interest 30. Operations performed on objects of interest 30 may include, but are not limited to, observing objects of interest 30, monitoring behavior of objects of interest 30, repairing objects of interest 30, destroying objects of interest 30, intercepting objects of interest 30, starting objects of interest 30, stopping objects of interest 30, providing supplies to objects of interest 30, moving objects of interest 30, interdicting objects of interest 30, or generating parameters 25 associated with objects of interest 30 and transmitting parameters 25 to resource allocator 40. In particular embodiments, the operation to be performed may include some, all, or none of the listed operations, or may include additional operations without departing from the scope of system 10. In general, however, the performed operation may be any appropriate number and type of operations suitable for use in system 10.

Operation may proceed, in particular embodiments of system 10, with resource allocator 40 receiving parameters 25 from each of a plurality of sensors 20, generating instructions 45 for each of plurality of operational resources 50 instructing the relevant operational resources 50 to perform an operation on one or more of objects of interest 30. In particular embodiments, each operational resource 50 may then perform one or more operations on one or more objects of interest 30. As discussed above, the operations performed by operational resources 50 may result in surveillance, destruction, repair, interdiction, or other appropriate operations being performed with respect to objects of interest 30. Additionally, these operations may result in additional parameters 25 being generated by operational resources 50, sensors 20, or other elements of system 10 and the described process being repeated.

Thus, system 10 manages the use of a limited set of operational resources 50 to respond to objects of interest 30 which may be participating in a prioritized set of situations of interest. Additionally, because the resource allocation quantifies various characteristics of constraints related to, and events occurring in system 10 and optimizes the management of information resources based on a quantified description of the state and goals of system 10, particular embodiments of system 10 may provide more efficient management of information gathering resources. As a result, system 10 may provide numerous operational benefits. Specific embodiments of system 10, however, may provide some, none, or all of these benefits.

Figure 2:
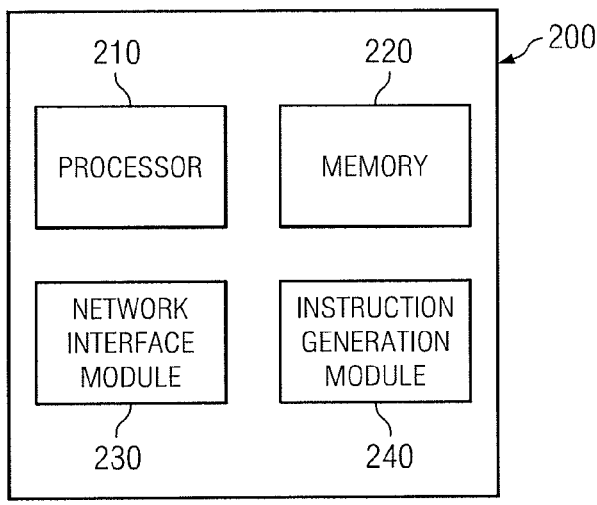
FIG. 2 is a block diagram illustrating in more detail a particular embodiment of a resource allocator that may be utilized in the resource allocation system of FIG. 1.

FIG. 2 is a block diagram illustrating in greater detail the contents and operation of a particular embodiment of resource allocator 40 shown in FIG. 1. In general, as discussed above with respect to FIG. 1, resource allocator 40 may receive one or more sets of parameters associated with objects of interest 30 from sensors 20, and generate instruction 45 based on the received parameters, a priority associated with a predetermined situation of interest, the likelihood that objects of interest 30 may be participating in a predetermined situation of interest, priorities associated with operations to be performed on objects of interest 30, last known positions and velocities of objects of interest 30, operating statuses of operational resources 50, and resource constraints. As shown in FIG. 2, resource allocator 40 may include a processor 210, a memory 220, a network interface module 230, and an instruction generation module 240.

Processor 210 may represent or include any form of processing component, including general purpose computers, dedicated microprocessors, or other processing devices capable of processing electronic information. Examples of processor 210 include digital signal processors (DSPs), application-specific integrated circuits (ASICs), field-programmable gate arrays (FPGAs), and any other suitable specific or general purpose processors. Although FIG. 2 illustrates a particular embodiment of resource allocator 40 that includes a single processor 210, resource allocator 40 may, in general, include any suitable number of processors 210.

Memory 220 stores a list of predetermined situations of interest, priorities associated with the predetermined situations of interest, operations to be performed by operational resources 50, location and configuration information corresponding to sensors 20, configuration information corresponding to operational resources 50, processor instructions, and/or any values and parameters that resource allocator 40 utilizes during operation. Memory 220 may comprise any collection and arrangement of volatile or non-volatile components suitable for storing data. For example, memory may comprise random access memory (RAM) devices, read only memory (ROM) devices, magnetic storage devices, optical storage devices, or any other suitable data storage devices. In particular embodiments, memory 220 may represent, in part, computer-readable media on which computer instructions are encoded. In such embodiments, some or all of the described functionality of resource allocator 40 may be provided by processor 210 executing instructions 45 encoded on the described media. Although shown in FIG. 2 as a single component, memory 220 may represent any number of memory elements within, local to, or accessible by resource allocator 40. Additionally, although shown in FIG. 2 as being located internal to resource allocator 40, memory 220 may represent storage components remote from resource allocator 40, such as elements at a Network Attached Storage (NAS), Storage Area Network (SAN), or any other type of remote storage component.

Network interface module 230 couples resource allocator 40 to appropriate components of system 10 to facilitate communication between resource allocator 40, sensors 20, operational resources 50, and/or other appropriate components of system 10. For example, resource allocator 40 may receive sets of parameters from sensor 20, and transmit instruction 45 to operational resource 50 through network interface module 230. In particular embodiments of system 10, network interface module may communicate with other components of system 10 via wired or wireless electronic signals, wired or wireless digital packet-based protocols, or by any other appropriate method suitable to perform the described functionality. In particular embodiments, network interface module 230 includes or represents one or more network interface cards (NICs) suitable for communication over a network.

Instruction generation module 240 generates instructions 45 that instruct operational resources 50 to perform operations on objects of interest 30. Instruction generation module 240 may generate instructions 45 based on parameters 25 received or generated by resource allocator 40. Processor 210 may then transmit instructions 45 to operational resources 50 through network interface module 230.

In general, each of processor 210, memory 220, network interface module 230, and instruction generation module 240 may represent any appropriate combination of hardware and/or software suitable to provide the described functionality. Additionally, any two or more of processor 210, network interface module 230, instruction generation module, may represent or include common elements. In particular embodiments, network interface module 230 and instruction generation module 240 may represent, in whole or in part, software applications being executed by processor 210.

To illustrate this process, an example of the optimization that may be performed by a particular embodiment of resource allocator is now described. In this example, the generalized problem domain is characterized by an input of ranked suspicious situations and a limited set of operational resources 50 that are managed to optimize responses to these situations of interest. It is assumed that resource surveillance activities, through Level-1 fusion processes, have provided a list of objects of interest 30 in an area of interest. For example, sensors 20 may observe objects of interest 30 and generate sets of parameters 25 describing the observed objects of interest 30. Additionally, it is assumed for this example, that Level-2 fusion processes have also provided the likelihood (credibility/confidence) of the existence of each situation of interest, and the probability that particular objects of interest 30 are involved in a specific situation.

To obtain more information on objects of interest 30, appropriate available operational resources 50 can be assigned to perform appropriate operations. Multiple operations can be performed on a particular object of interest 30, each operation consuming resource capacity and resulting in a possible "benefit" or outcome. The problem is complicated by the fact that some of the operations are related, i.e., if one operation is performed then further application of another operation may be unnecessary. On the other hand, performing some less expensive surveillance operations could improve situational understanding; and depending on the situational understanding the potential threat could be revised downwards (to do-nothing) or upwards (for subsequent operations). A course of action is then defined by selecting a sequence of operations to be performed and assigning them to the available operational resources 50 in order to respond to potential threat situations that are evolving real-time, in an efficient manner.

For purposes of this example, the following parameters 25 and notations are utilized:

The available operational resources are indexed by $i \in \{1, \ldots, I\}$;

The operations each operational resource can perform are indexed by $j \in \{0, \ldots, J\}$;

The situations of interest are indexed by $k \in \{1, \ldots, K\}$;

The objects of interest in the area of regard are indexed by $l \in \{1, \ldots, L\}$;

In this example, operational resources and objects of interest are related by the operations performed, i.e., an operational resource can perform an operation on a designated object of interest. Additionally, Action j=0 refers to an operational resource performing an operation, but not on an object of interest (e.g., refuel/resupply operation). Let ">" denote the relation "is of higher priority than."

Furthermore, for this example, the following parameters are defined over appropriate indices.

$$\Phi_{k_1 k_2} = \begin{cases} 1 & \text{if situation } k_1 > \text{situation } k_2 \\ 0 & o.w.; \end{cases}$$

$$\Theta_{j_1 j_2 k} = \begin{cases} 1 & \text{if action } j_1 > \text{action } j_2 \text{ for situation } k \\ 0 & o.w.; \end{cases}$$

$\rho_{lk}$ represents the likelihood of involvement for object of interest l in situation k;

$$\alpha_{ij} = \begin{cases} 1 & \text{if resource } i \text{ can perform action } j \\ 0 & o.w.; \end{cases}$$

$$\beta_{jl} = \begin{cases} 1 & \text{if action } j \text{ can be performed on object of interest } l \\ 0 & o.w.; \end{cases}$$

$\bar{t}_{ij}$ is the expected time needed for operational resource i to perform operation j. In this example, this value does not include the "set-up time," i.e., the time needed by the relevant operational resource to get into position to perform the assigned operation;

$A_i$ is the set of obstacles that resource i must avoid;

$T^C$ is the current time;

$\hat{T}$ is the planning horizon;

$\bar{X}_i$ is the location of resupply areas for resource i;

$\bar{T}_i$ is the maximum time resource i can be away from one of the resupply areas in $\bar{X}_i$;

$\hat{X}_l$ is the most recent positional update of the l-th object of interest;

$\hat{V}_l$ is the most recent velocity update of the l-th object of interest;

$\hat{t}_l$ is the time of the most recent positional update of the l-th object of interest;

$\hat{X}_l^e(\tau)$ is the expected position of the l-th object of interest, at time $\tau$;

$Y_j^{min}$ is the minimum allowable time difference between $T^C$ and the time of most recent positional update of object of interest, in order to perform operation/on that object of interest;

$Y_j^{max}$ the maximum allowable time difference between $T^C$ and the time of most recent positional update of object of interest, in order to perform operation j on that object of interest;

Furthermore, in the described example, the decisions made by resource allocator 40 are reflected in the following values, which may, in turn, be the basis for instructions 45 generated by resource allocator 40:

$X_i(\tau)$ is the position of operational resource i at time $\tau$;

$V_i(\tau)$ is the velocity of operational resource i at time $\tau$;

$$\lambda_{il} = \begin{cases} 1 & \text{if resource } i \text{ is assigned to object } l \\ 0 & o.w.; \end{cases}$$

$I_i$ is the number of objects of interest assigned to operational resource i;

$$\hat{\delta}_{iml} = \begin{cases} 1 & \text{if the } m\text{-th action of resource } i \text{ is performed} \\ & \text{on object of interest } l \\ 0 & o.w.; \end{cases}$$

$$\mu_{jl} = \begin{cases} 1 & \text{if action } j \text{ is performed on object of interest } l \\ 0 & o.w.; \end{cases}$$

$$\hat{\mu}_l = \begin{cases} 1 & \text{if no action is performed on onbject of interest } l \\ 0 & o.w.; \end{cases}$$

$$\hat{\varepsilon}_{imj} = \begin{cases} 1 & \text{if the } m\text{-th action of resource } i \text{ is action } j \\ 0 & o.w.; \end{cases}$$

$\hat{S}_l$ is the expected start time of an operation performed on object of interest l;
$\hat{E}_l$ is the expected finish time of an operation performed on object of interest l;
$S_{im}$ is the expected start time of the m-th operation performed by operational resource i;
$E_{im}$ is the expected finish time of the m-th operation performed by operational resource i;
$\hat{t}_{iml}$ is the expected 'set-up time' of the m-th operation of operational resource i, performed on object of interest l;
$\hat{t}_{im0}$ is the expected 'set-up time' of the m-th operation of operational resource i, where the operation is to visit one of the resupply areas in $\overline{X}_i$.

Additionally, in this example, the following constraints are assumed to apply:

$$\hat{S}_l = \sum_{i=1}^{I} \sum_{m=1}^{I_i} \hat{\delta}_{iml} S_{im} + \hat{\mu}_l \hat{T} \forall l \in \{1, \ldots, L\} \quad (1)$$

$$\hat{E}_l = \sum_{i=1}^{I} \sum_{m=1}^{I_i} \hat{\delta}_{iml} E_{im} + \hat{\mu}_l \hat{T} \forall l \in \{1, \ldots, L\} \quad (2)$$

$$\sum_{j=1}^{J} \mu_{jl} + \hat{\mu}_l = 1 \forall l \in \{1, \ldots, L\} \quad (3)$$

$$I_i = \sum_{l=1}^{L} \lambda_{il} \forall i \in \{1, \ldots, I\} \quad (4)$$

$$\mu_{jl} = \sum_{i=1}^{I} \sum_{m=1}^{I_i} \hat{\delta}_{iml} \hat{\varepsilon}_{imj} \forall l \in \{1, \ldots, L\}, j \in \{1, \ldots, J\} \quad (5)$$

$$E_{im} = S_{im} + \sum_{j=0}^{J} \bar{t}_{ij} \hat{\varepsilon}_{imj} \forall m \in \{1, \ldots, I_i\}, i \in \{1 \ldots, I\} \quad (6)$$

$$(T^C - \hat{t}_l)\mu_{jl} \leq Y_j^{max} \forall l \in \{1, \ldots, L\}, j \in \{1 \ldots, J\} \quad (7)$$

$$Y_j^{min} \mu_{jl} \leq (T^C - \hat{t}_l) \forall l \in \{1, \ldots, L\}, j \in \{1, \ldots, J\} \quad (8)$$

$$\hat{\varepsilon}_{imj} \leq \alpha_{ij} \forall m \in \{1, \ldots, I_i\}, i \in \{1 \ldots, I\}, j \in \{1 \ldots, J\} \quad (9)$$

$$\sum_{j=0}^{J} \hat{\varepsilon}_{imj} = 1 \forall m \in \{1, \ldots, I_i\}, i \in \{1 \ldots, I\} \quad (10)$$

$$\mu_{jl} \leq \beta_{jl} \forall j \in \{1, \ldots, J\}, l \in \{1 \ldots, L\} \quad (11)$$

$$\hat{\varepsilon}_{im0} + \sum_{l=1}^{L} \hat{\delta}_{iml} = 1 \forall m \in \{1, \ldots, I_i\}, i \in \{1 \ldots, I\} \quad (12)$$

$$S_{im_2} - S_{im_1} \leq T_i \left(1 + \sum_{m=m_1}^{m_2} \varepsilon_{im0}\right) \quad (13)$$

$$\forall m_1, m_2 \in \{1, \ldots, I_i\}, m_1 < m_2, i \in \{1, \ldots, I\}$$

$$E_{i0} = T^C \forall i \in \{1, \ldots, I\} \quad (14)$$

$$S_{im} = E_{i,m-1} + \sum_{l=1}^{L} \hat{t}_{iml} \hat{\delta}_{iml} + \hat{t}_{im0} \hat{\varepsilon}_{im0} \quad (15)$$

$$\forall m \in \{1, \ldots, I_i\}, i \in \{1, \ldots, I\}$$

$$\forall m \in \{1, \ldots, I_i\}, i \in \{1, \ldots, I\}, l \in \{1, \ldots, L\} \quad (16)$$

$$\hat{t}_{iml} = \min \tau$$
$$\text{s.t.}$$

$$\|X_i(T^C + \tau) - \hat{X}_l^e(T^C + \tau)\| = 0 \quad (17)$$

$$X_i(\tau) \notin A_i \forall \tau \quad (18)$$

$$\tau \geq 0 \quad (19)$$

$$\hat{t}_{im0} = \min_{1 \leq h \leq H} [\tau_h] \quad (20)$$

$$\forall m \in \{1, \ldots, I_i\}, i \in \{1, \ldots, I\}, l \in \{1, \ldots, L\}, h \in \{1, \ldots, H\} \quad (21)$$

$$\tau_h = \min \tau$$
$$\text{s.t.}$$

$$\|X_i(T^C + \tau) - \hat{X}_{ih}\| = 0 \quad (22)$$

$$X_i(\tau) \notin A_i \forall \tau \quad (23)$$

$$\tau \geq 0 \quad (24)$$

$$\lambda_{il} \in \{0, 1\} \forall i \in \{1, \ldots, I\}, l \in \{1, \ldots, L\} \quad (25)$$

$$I_i \in \mathbb{Z}^+ \cup \{0\} \forall i \in \{1, \ldots, I\} \quad (26)$$

$$\hat{\delta}_{iml} \in \{0, 1\} \forall m \in \{1, \ldots, I_i\}, \forall i \in \{1, \ldots, I\}, l \in \{1, \ldots, L\} \quad (27)$$

$$\mu_{jl} \in \{0, 1\} \forall j \in \{1, \ldots, J\}, l \in \{1, \ldots, L\} \quad (28)$$

$$\hat{\mu}_l \{0, 1\} \forall l \in \{1, \ldots, L\} \quad (29)$$

$$\hat{\varepsilon}_{imj} \in \{0, 1\} \forall m \in \{1, \ldots, I_i\}, i \in \{1 \ldots, I\}, j \in \{1, \ldots, J\} \quad (30)$$

$$S_l \geq 0 \forall l \in \{1, \ldots, L\} \quad (31)$$

$$E_l \geq 0 \forall l \in \{1, \ldots, L\} \quad (32)$$

$$S_{im} \geq 0 \forall m \in \{1, \ldots, I_i\}, i \in \{1, \ldots, I\} \quad (32)$$

$$E_{im} \geq 0 \forall m \in \{1, \ldots, I_i\}, i \in \{1, \ldots, I\} \quad (34)$$

$$\hat{t}_{iml} \geq 0 \forall m \in \{1, \ldots, I_i\}, i \in \{1, \ldots, I\}, l \in \{1, \ldots, L\} \quad (35)$$

$$\hat{t}_{im0} \geq 0 \forall m \in \{1, \ldots, I_i\}, i \in \{1, \ldots, I\} \quad (36)$$

Constraint (1): Relates the expected starting time of the operation performed on the l-th object of interest with the expected starting time of the m-th operation performed by operational resource i. In this example, the expected starting time is set to $\hat{T}$ if no operation is to be performed on the l-th object of interest.

Constraint (2): Relates the expected ending time of the operation performed on the l-th object of interest with the expected ending time of the m-th operation performed by operational resource i. In this example, the expected ending time is set to $\hat{T}$ if no operation is to be performed on the l-th object of interest.

Constraint (3): Either object of interest l has an operation performed on it in the current time horizon, $\hat{T}$, or it does not.

Constraint (4): Computes the number of objects of interest assigned to operational resource i.

Constraint (5): Determines whether operation j is performed on object of interest l.

Constraint (6): Computes the expected ending time of the m-th operation performed by operational resource i.

Constraints (7) and (8): Allows operation j to be performed on object of interest l only if the time of most recent kinematic update on object of interest l, $\hat{t}_l$, is within a certain time window with respect to the current time, $T^C$.

Constraint (9): Allows the m-th operation of operational resource i to be operation j only if operational resource i can in fact perform operation j.

Constraint (10): The m-th operation of operational resource i is assigned exactly one operation type to perform.

Constraint (11): Limits the operations that are allowed to be performed on the l-th object of interest (possibly input real-time by a COA analyst).

Constraint (12): Allows the assignment of object of interest for the m-th operation performed by operational resource i only when the m-th operation for operational resource i is not visiting a resupply position in $\overline{X}_i$.

Constraint (13): Enforces resupply operation for operational resource i, between any two operations performed by operational resource i that have a difference of expected start times larger than $T_i$.

Constraint (14): Sets the expected end time of the 0-th operation performed by operational resource i to be the current time, $T^C$ (this is needed for Constraint (15)).

Constraint (15): Relates the expected start time of the m-th operation performed by operational resource i to the expected end time of the (m−1)-st operation performed by operational resource i and the expected "set-up time" for operational resource i to be in position to perform the m-th operation.

Constraints (16)-(19): Computes the least time route for the m-th operation of operational resource i to be performed on object of interest l.

Constraint (20): Computes the minimal time for operational resource i to reach a re-supply location.

Constraints (21)-(24): Computes the least time route for the m-th operation of operational resource i to be a resupply operation, at the h-th resupply location.

Constraints (25)-(36): Specifies the domain of the decision variables.

In this example, an objective function, F (e.g., Equation 37 below), minimizes the sum of the expected start times of the operations performed on objects of interest 30, each start time weighted by a function that incorporates the situation (i.e., mission) priorities, $\Phi$, the operation priorities for each situation, $\Theta$, as well as the likelihood that each object of interest 30 is participating in each situation, $\rho_{lk}$ (for object of interest and situation k), where:

$$\eta_{jk} = \left(\frac{1}{2}\right)^{JA_k^1 + B_{jk}}, A_k^1 = K - 1 - \sum_{\substack{k_1=1 \\ k_1 \neq k}}^{K} \Phi_{k_1 k}, \quad (37)$$

and $$B_{jk} = J - 1 - \sum_{\substack{j_1=1 \\ j_1 \neq j}}^{J} \Theta_{j_1 jk}.$$

$$F = \min \sum_{l=1}^{L} \left[ \sum_{j=1}^{J} \left( \left[ \prod_{k=1}^{K} \eta_{jk}^{\rho_{lk}} \right] \mu_{jl} \right) + K \hat{\mu}_l \right] \hat{s}_l$$

In particular embodiments, the above optimization formulation is NP-Hard. Uncertainty in the current location of objects of interest 30, the probabilistic nature of the situations that objects of interest 30 are participating in, and the fact that objects of interest are potentially moving with an unknown velocity may increase the complexity of optimizing the above objective function. Thus, heuristic solution approaches may be used to optimize the objective function.

For example, system 10 may make use of a Greedy Randomized Adaptive Search Procedure (GRASP) to optimize the objective function described above. While no one heuristic will perform well on all optimization problems, the GRASP approach works very well on non-linear problems when there are multiple local optima different from the global optimum. In particular embodiments, the GRASP algorithm is a multi-start algorithm, with each iteration consisting of a construction and local search phase. The construction phase quickly builds up a good quality solution, incorporating greediness and randomization in the built-up solution. Since the construction phase does not necessarily build a solution that is even locally optimal, a local search phase is incorporated to explore a neighborhood of the solution built in the construction phase.

FIG. 3A provides pseudocode of one example of a GRASP algorithm that may be utilized by a particular embodiment of resource allocator 40. In this example, a solution entails a schedule for each operational resource 50, each comprising an ordered list of objects of interest 30 that the relevant operational resource 50 will collect information on, the operations that operational resource 50 will perform on each object of interest 30 assigned, as well as the route operational resource 50 will take to perform the operation on objects of interest 30 on this operational resources 50 list. FIG. 3B displays high-level pseudocode for the construction phase of a GRASP algorithm according to a particular embodiment of resource allocator 40.

The local search phase of the described GRASP approach incorporates five different neighborhood structures. These neighborhood structures are: i) interchanging two objects of interest 30, on two distinct resource schedules, ii) interchanging the order of two objects of interest 30, on one resource schedule, iii) removing an object of interest 30 from a resources schedule and inserting it at a different place on the same resource schedule, iv) removing an object of interest 30 from a resources schedule (so that the relevant object of interest 30 is not assigned to any operational resource 50), and v) assigning an operational resource 50 to a particular object of interest 30 that is currently not assigned to any resource. Each iteration inside the local search phase randomly chooses one of the neighborhood structures, randomly determines a neighbor of the current best solution, and determines if the neighbor produces a better solution than the current best solution. If this is the case, then the current best solution is set to the neighbor solution, and the local search phase is continued. FIG. 3C presents an example of high-level pseudocode for the local search phase according to one embodiment of resource allocator 40.

Figure 4:
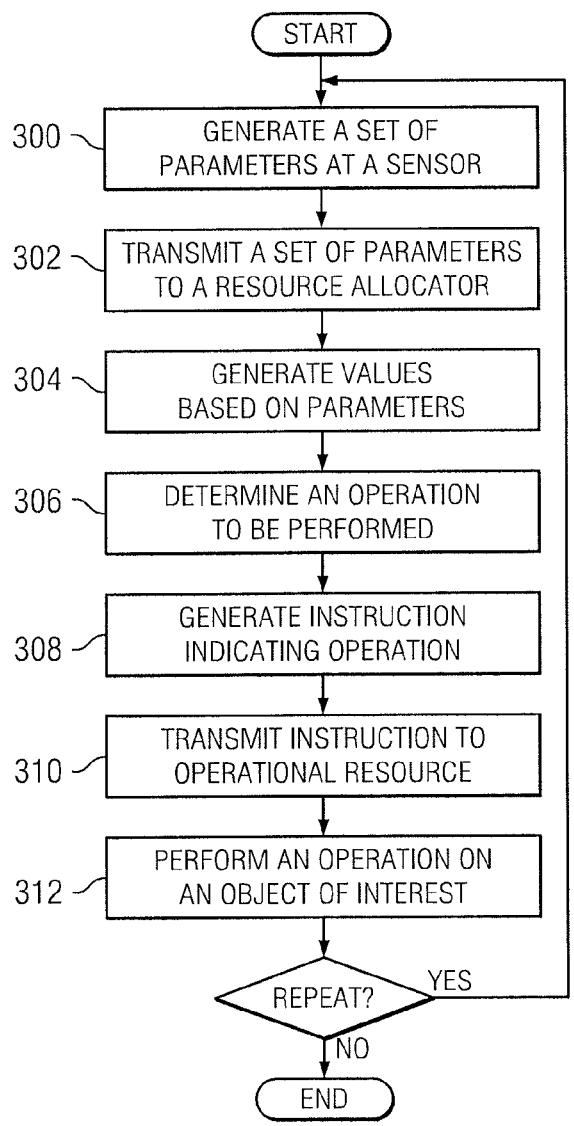
FIG. 4 is a flow chart illustrating example operation of the resource allocator shown in FIG. 2.

FIG. 4 is a flowchart illustrating operation of a particular embodiment of system 10 in allocating resources to respond to situations of interest. The steps illustrated in FIG. 4 may be combined, modified, or deleted where appropriate, and additional steps may also be added to those shown. Additionally, the steps may be performed in any suitable order without departing from the scope of system 10.

Operation, in the illustrated example, begins at step 300 with one or more sensors 20 observing an object of interest 30 and generating parameters 25 associated with the observed object of interest 30. As noted above, sensors 20 may observe objects of interest 30 by using any appropriate technology capable including, but not limited to, sonar, conventional photography, video recording, infrared photography, and x-ray technology.

At step 302, sensor 20 transmits parameters 25 to resource allocator 40. Resource allocator 40 subsequently receives parameters 25, and at step 304, generates a plurality of values based at least on parameters 25 received from sensors 20 and/or additional parameters 25 received or generated by resource allocator 40. For example, in particular embodiments, resource allocator 40 generates a set of values based at least in part on the probability that a particular object of interest 30 is participating in a particular situation of interest. In particular, as described above, resource allocator 40 may evaluate an objective function based on the probability that one or more objects of interest 30 are participating in a particular situation of interest and/or other parameters 25 generated or received by resource allocator 40. In such embodiments, the value of the objective function may depend, in part, on a proposed operation to be performed involving an object of interest 30 and the operational resource 50 selected to perform the operation. As a result, resource allocator 40 may generate values for the objective function for one or more possible combinations of operations and selected operational resources 50.

At step 306, resource allocator 40 determines an operation to be performed involving an object of interest 30 based on the set of values. Depending on its configuration and capabilities, resource allocator 40 may also make additional resource management decisions based on the set of values. For example, in particular embodiments, resource allocator 40 selects a number of operations to be performed and a set of operational resources 50 to perform these operations based on the combinations of operations and selected operational resources that minimize or maximize the value of the objective function. At step 308, resource allocator 40 generates an instruction 45 indicating the operation or operations selected by resource allocator 40

At step 310, resource allocator 40 transmits instruction 45 to a particular operational resource 50 instructing that operational resource to perform the relevant operation. In particular embodiments, the operational resource 50 to which resource allocator 40 transmits instruction 45 may be determined based on the values generated by resource allocator 40 or may be predetermined (e.g., in a system 10 with a single operational resource 50 or multiple, identically-situated operational resources 50). Additionally, in particular embodiments, resource allocator 40 may transmit, under certain circumstances, one or more instructions 45 to multiple different operational resources 50 to initiate multiple operations involving one or more objects of interest 30.

At step 312, an operational resource 50 that receives instruction 45 performs an operation on one or more objects of interest 30. As discussed above, the operations performed on objects of interest 30 may include such actions as observing the relevant objects of interest 30, monitoring behavior of objects of interest 30, repairing objects of interest 30, destroying objects of interest 30, intercepting objects of interest 30, starting objects of interest 30, stopping objects of interest 30, providing supplies to objects of interest 30, moving objects of interest 30, interdicting objects of interest 30, or generating additional information (such as parameters 25) regarding objects of interest 30. In general, however, operational resources 50 may perform any appropriate and number of operations on any suitable objects of interest 30 in response to instructions 45.

Operation may continue by optionally repeating steps 300-312. As a result, resource allocator 40 may receive parameters 25 from each of a plurality of sensors 20 and generate instruction 45 for each of plurality of operational resources 50 to perform an operation on one or more of objects of interest 30. By optionally repeating steps 300-312, system 10 may utilize information obtained from a first operation or set of operations to optimize selection of subsequent operations, thus selecting a sequence of operations that optimizes the response to potential situations of interest that are evolving in real time. For example, resource allocator 40 may instruct an operational resource 50 to perform a first operation on an object of interest 30 and then instruct other operational resources 50 to perform additional operations based on parameters 25 generated by the first operational resource 50 in completing the first operation. As a result, particular embodiments of system 10 optimally allocate the use of a limited set of operational resources 50 to respond to objects of interest 30 which may be participating in situations of interest.

FIGS. 5A-5E and FIGS. 6A-6D illustrate the operation of a particular embodiment of system 10 in responding to an example set of parameters 25 and objects of interest 30. In particular, FIGS. 5A-5E and FIGS. 6A-6D describe an example system 10 for managing maritime information assets. FIGS. 5A-5E describe inputs and the initial state of system 10, while FIGS. 6A-6D describe outputs generated by resource allocator 40 and certain changes in the state of system 10 that result from these outputs.

Figure 5B:
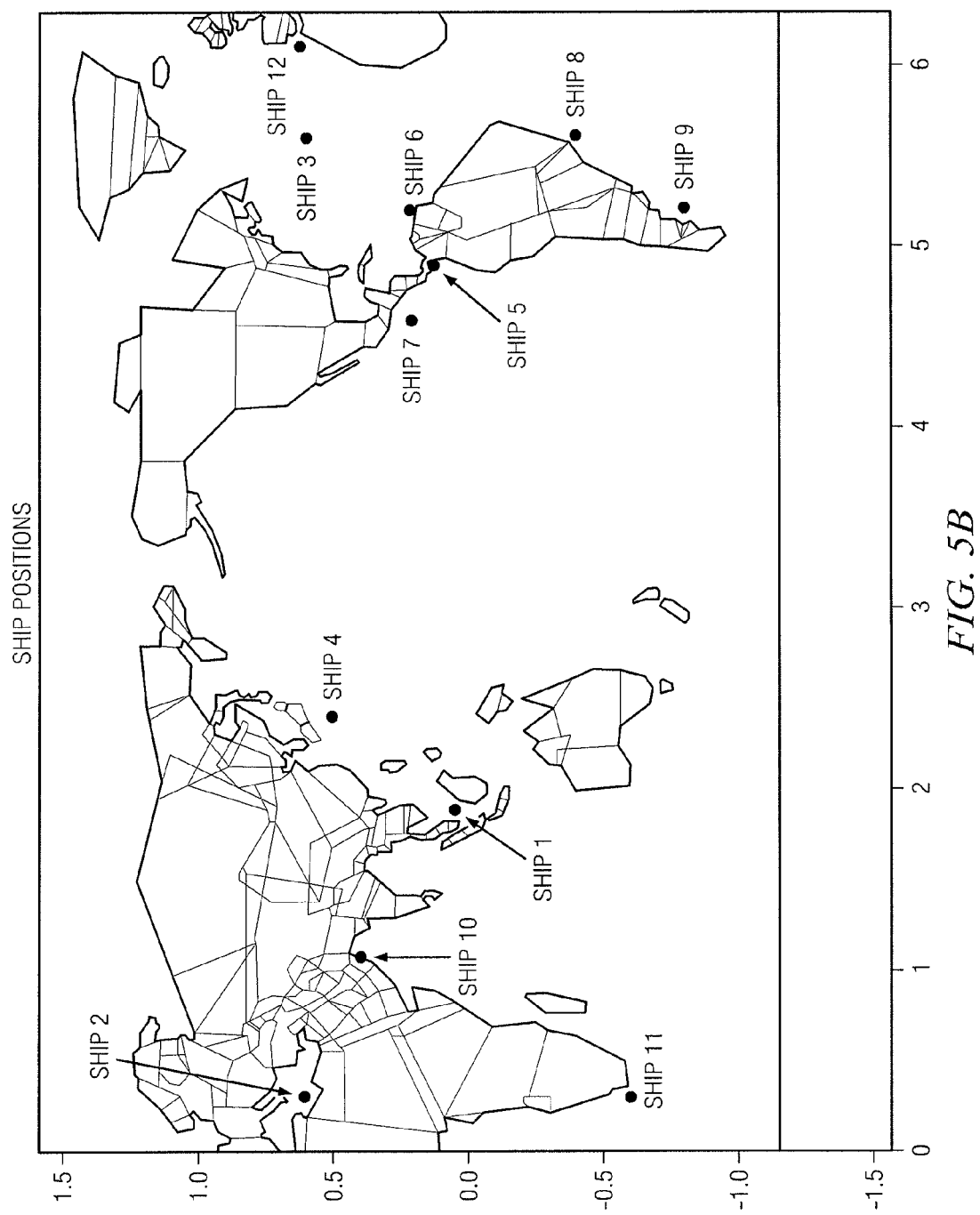
Figure 5E:
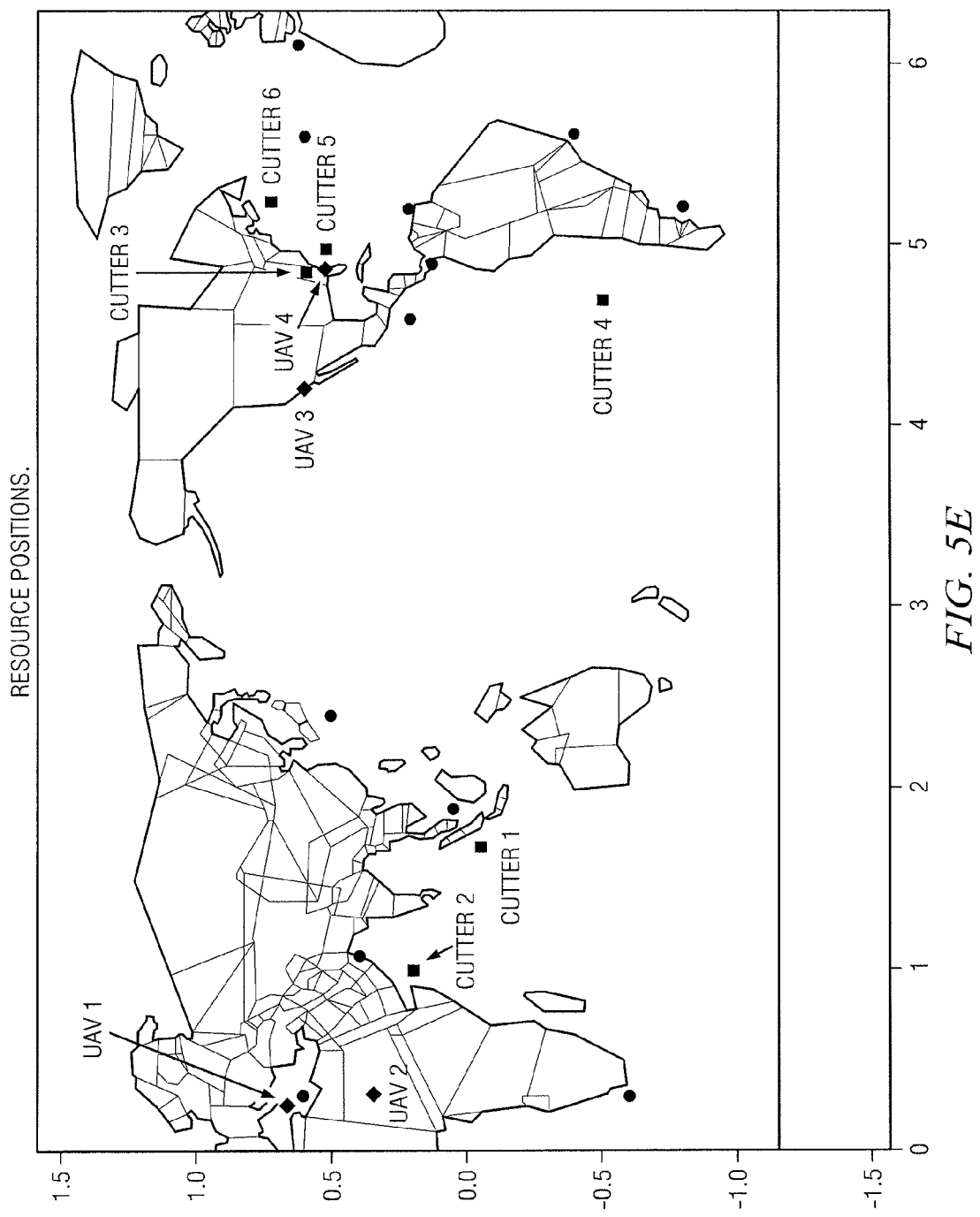

In the described example, a set of ordered situations of interest is defined, say $S_1, \ldots, S_6$, with $S_1 > S_2 > \ldots > S_6$. FIG. 5A displays certain characteristics of a set of twelve merchant vessels that have positive likelihood of participating in the defined situations of interest. The "ID" column lists an ID for each of the objects of interest 30, which in this example represent merchant ships. The last reported position is indicated (in degrees) by the "LONGITUDE" and "LATITUDE" columns. The "SPEED" column presents the last reported speed (in knots). The time of the last reported position is shown (in hours) in the "TIME" column, with the current time being 140 hours. The "SITUATIONS" and "LIKELIHOOD" columns list the likely situations of interest these merchant ships are participating in, along with their likelihood of participation. As shown by FIG. 5A, it is possible, in this example, for a merchant ship to probabilistically be involved in multiple situations of interest. FIG. 5B presents the position of the various merchant ships on a world map, along with land masses (i.e., obstacles).

In this example, there are two types of operational resources 50 available to respond to potential situations of interest: Unmanned Aerial Vehicles (UAVs) and blue-force Cutters. It is assumed, for purposes of this example, UAVs can move on the order of 300 knots and fly at a fixed altitude of 60,000 feet, while Cutters can move on the order of 25 knots. Three types of operations are possible for operational resources 50 in this example: determine the location of the merchant ship (search), monitor the behavior of the merchant ship, and interdict the merchant ship. FIG. 5C displays the operations that each operational resource 50 can perform. FIG. 5D presents the current positions of operational resources 50, and FIG. 5E displays them on the world map.

Figure 6B:
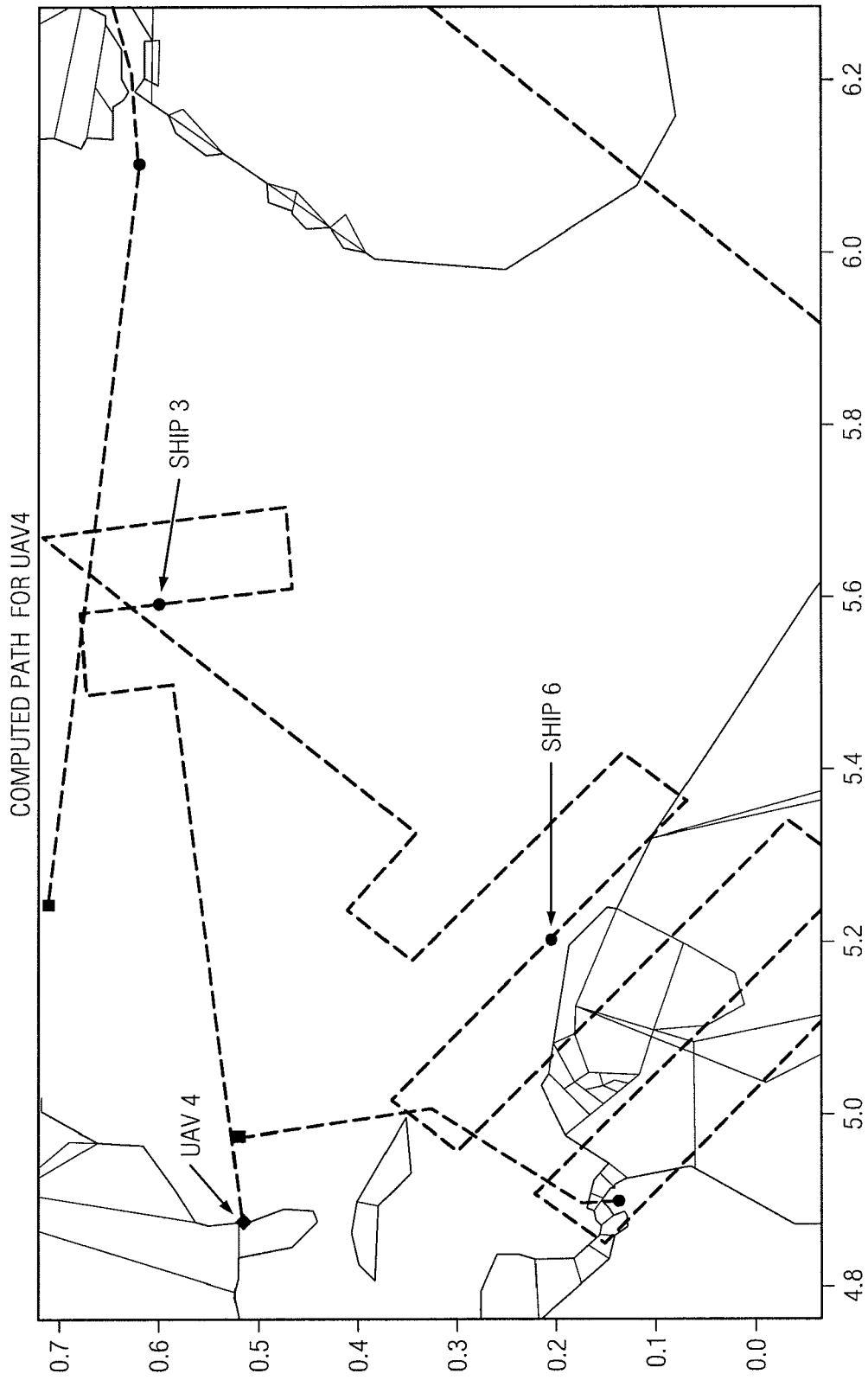
Figure 6C:
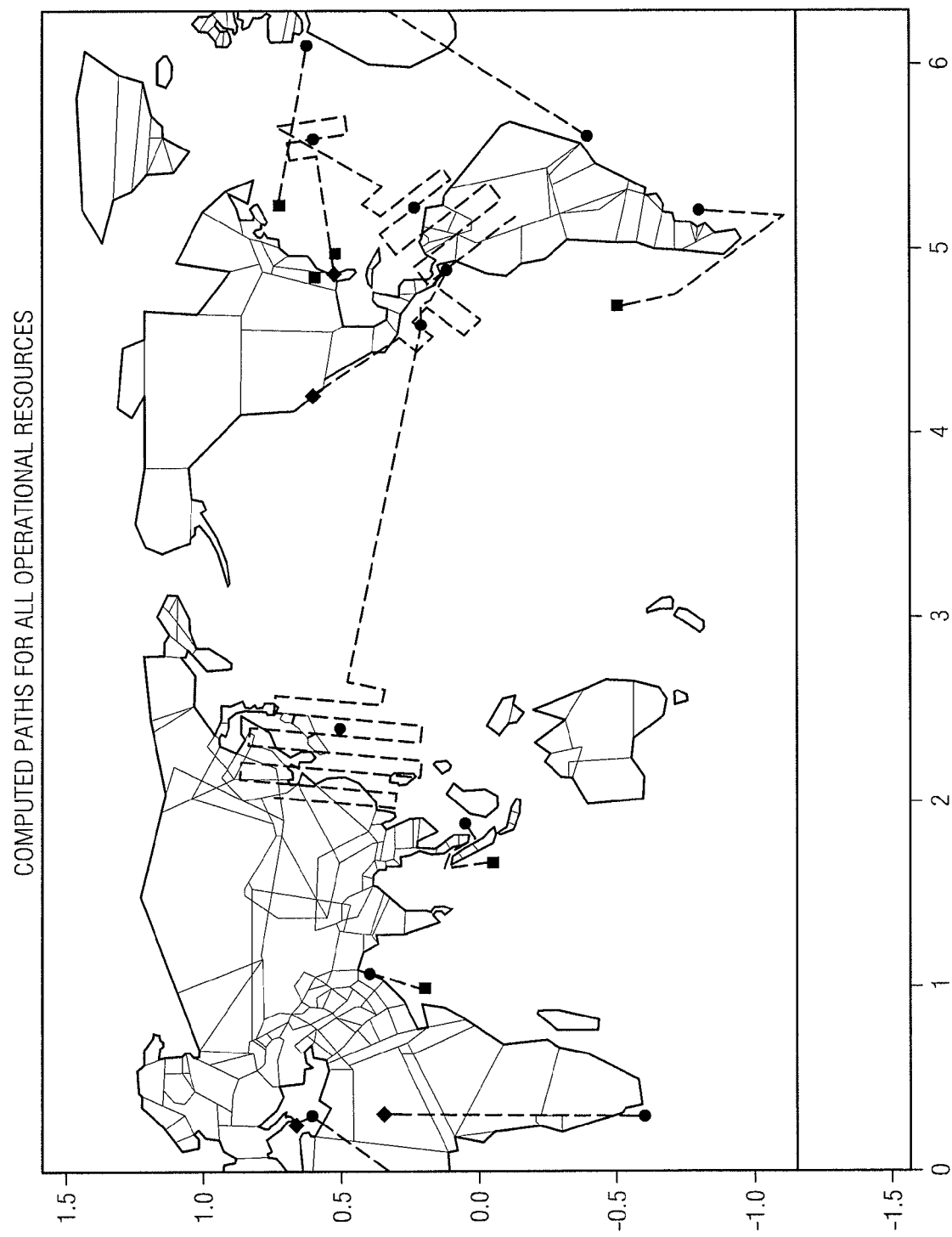

FIG. 6A presents the output of the GRASP algorithm for the assignment of operational resources 50 to merchant ships and the tasks that these operational resources 50 will perform on their assigned ships. FIG. 6B displays a close-up view of the computed path for a particular operational resource 50 (UAV 4) in order to accomplish its computed schedule of first searching for Ship 3 and then searching for Ship 6. As can be seen, the planned path for UAV 4 takes into account the expanding uncertainty region (as a function of the time of last kinematic update) for both Ships, 3 and 6. FIG. 6C displays the planned paths that all operational resources 50 will take in order to accomplish the computed schedules generated for them in this example. Again, in this example, the planned path for each UAV and Cutter takes into account the last known positions, speeds, and headings of the ships of interest on their schedule, while avoiding known obstacles (e.g., land masses for Cutters, no-fly zones for UAVs, etc.). As a result, the schedule produces an optimized course of action for directing the operational resources 50 (here, UAVs and Cutters) in responding to the potential situations of interest presented by objects of interest 30 (here, merchant ships).

Although the present invention has been described in detail, it should be understood that various changes, substitutions and alterations can be made hereto without departing from the sphere and scope of the invention as defined by the appended claims.

What is claimed is:

1. An resource allocation system comprising:
a resource allocator operable to:
  receive one or more parameters associated with an object of interest, wherein at least one of the parameters corresponds to a probability that the object of interest is participating in a predetermined situation of interest;
  calculate a plurality of values based at least in part on the parameters;
  select, based at least in part on the calculated values, one or more operations to be performed involving the object of interest;
  generate an instruction based at least in part on the operation to be performed; and
  transmit the instruction to an operational resource.

2. The system of claim 1, wherein the resource allocator is further operable to select one or more operations to be performed by selecting one or more operations associated with a minimum value of the plurality of values.

3. The system of claim 1, wherein the resource allocator is further operable to select one or more operations to be performed by selecting one or more operations associated with a maximum value of the plurality of values.

4. The system of claim 1, further comprising:
a sensor operable to:
  generate the parameters associated with an object of interest; and
  transmit the parameters to the resource allocator; and
an operational resource operable to:
  receive the instruction; and
  perform an operation on the object of interest in response to the received instruction.

5. The system of claim 4, wherein the sensor is operable to generate the parameters associated with the object of interest by:
  determining a position associated with the object of interest;
  determining a velocity associated with the object of interest; and
  generating the parameters based at least in part on the determined position and the determined velocity.

6. The system of claim 4, wherein the operational resource is operable to perform the operation by performing at least one of:
  repairing the object of interest;
  destroying the object of interest;
  stopping the object of interest from moving;
  moving the object of interest; and
  generating parameters associated with the object of interest and transmitting the parameters to the resource allocator.

7. The system of claim 1, wherein the resource allocator is operable to generate the instruction by generating the instruction based at least in part on one of:
  a predetermined priority associated with the predetermined situation of interest; and
  a predetermined priority associated with an operation to be performed on the object of interest.

8. The system of claim 1, wherein the resource allocator is further operable to:
  receive a plurality of parameter sets from a plurality of sensors, wherein each parameter set comprises one or more parameters associated with one of a plurality of objects of interest, and wherein at least one of the parameters in each parameter set corresponds to a probability that the associated object of interest is participating in a predetermined situation of interest;
  generate a plurality of values based on the parameter sets, wherein each of the values corresponds to a set of operations to be performed involving the objects of interest;
  select a set of operations to be performed based on the values; and
  generate a plurality of instructions, each of the instructions indicating an operation to be performed; and
  transmit the plurality of instructions to a plurality of operational resources.

9. A method for allocation of operational resources comprising:
  receiving one or more parameters associated with an object of interest, wherein at least one of the parameters corresponds to a probability that the object of interest is participating in a predetermined situation of interest;
  calculating a plurality of values based at least in part on the parameters;
  selecting, based at least in part on the calculated values, one or more operations to be performed involving the object of interest;
  generating an instruction based at least in part on the operation to be performed; and
  transmitting the instruction to an operational resource.

10. The method of claim 9, wherein selecting one or more operations to be performed comprises selecting one or more operations associated with a minimum value of the plurality of values.

11. The method of claim 9, wherein selecting one or more operations to be performed comprises selecting one or more operations associated with a maximum value of the plurality of values.

12. The method of claim 9, wherein generating parameters associated with the object of interest comprises:
  determining a position associated with the object of interest;
  determining a velocity associated with the object of interest; and
  generating the parameters based at least in part on the determined position and the determined velocity.

13. The method of claim 9, wherein performing the operation comprises performing at least one of:
  repairing the object of interest;
  destroying the object of interest;
  stopping the object of interest from moving;
  moving the object of interest; and
  generating a parameters associated with the object of interest and transmitting the parameters to the resource allocator.

14. The method of claim 9, wherein generating the instruction comprises by generating an instruction based at least in part on one of:
  a predetermined priority associated with the predetermined situation of interest; and
  a predetermined priority associated with an operation to be performed on the object of interest.

15. The method of claim 9, further comprising:
  receiving a plurality of parameter sets from a plurality of sensors, wherein each parameter set comprises one or more parameters associated with one of a plurality of objects of interest, and wherein at least one of the parameters in each parameter set corresponds to a probability that the associated object of interest is participating in a predetermined situation of interest;
  generating a plurality of values based on the parameter sets, wherein each of the values corresponds to a set of operations to be performed involving the objects of interest;
  selecting a set of operations to be performed based on the values;
  generating a plurality of instructions, each of the instructions indicating an operation to be performed; and
  transmitting the plurality of instructions to a plurality of operational resources.

16. Logic for allocating operational resources, the logic encoded on tangible media, and operable, when executed on a processor, to:
  receive one or more parameters associated with an object of interest, wherein at least one of the parameters corresponds to a probability that the object of interest is participating in a predetermined situation of interest;
  calculate a plurality of values based at least in part on the parameters;
  select, based at least in part on the calculated values, one or more operations to be performed involving the object of interest;
  generate an instruction based at least in part on the operation to be performed; and
  transmit the instruction to an operational resource.

17. The logic of claim 16, wherein the logic is further operable to select one or more operations to be performed by selecting one or more operations associated with a minimum value of the plurality of values.

18. The logic of claim 16, wherein the logic is further operable to select one or more operations to be performed by selecting one or more operations associated with a maximum value of the plurality of values.

19. The logic of claim 16, wherein the logic is operable to generate parameters associated with the object of interest by:
  determining a position associated with the object of interest;
  determining a velocity associated with the object of interest; and
  generating the parameters based at least in part on the determined position and the determined velocity.

20. The logic of claim 16, wherein the logic is operable to generate the instruction by generating an instruction that instructs an operational resource to perform at least one of:
  repairing the object of interest;
  destroying the object of interest;
  stopping the object of interest from moving;
  moving the object of interest; and
  generating a parameters associated with the object of interest and transmitting the parameters to the resource allocator.

21. The logic of claim 16, wherein the logic is operable to generate the instruction by generating the instruction based at least in part on one of:
  a predetermined priority associated with the predetermined situation of interest; and
  a predetermined priority associated with an operation to be performed on the object of interest.

22. The logic of claim 16, wherein the logic is further operable to:
  receive a plurality of parameter sets from a plurality of sensors, wherein each parameter set comprises one or more parameters associated with one of a plurality of objects of interest, and wherein at least one of the parameters in each parameter set corresponds to a probability that the associated object of interest is participating in a predetermined situation of interest;
  generate a plurality of values based on the parameter sets, wherein each of the values corresponds to a set of operations to be performed involving the objects of interest;
  select a set of operations to be performed based on the values; and
  generate a plurality of instructions, each of the instructions indicating an operation to be performed; and
  transmit the plurality of instructions to a plurality of operational resources.

23. A system for allocating operational resources comprising:
  means for receiving one or more parameters associated with an object of interest, wherein at least one of the parameters corresponds to a probability that the object of interest is participating in a predetermined situation of interest;
  means for calculating a plurality of values based at least in part on the parameters;
  means for selecting, based at least in part on the calculated values, one or more operations to be performed involving the object of interest;
  means for generating an instruction based at least in part on the operation to be performed; and
  means for transmitting the instruction to an operational resource.

* * * * *